H. D. CAMMACK & E. V. VERHEYEN.
HEADLIGHT ADJUSTING MEANS.
APPLICATION FILED FEB. 15, 1916.

1,206,665.

Patented Nov. 28, 1916.
3 SHEETS—SHEET 1.

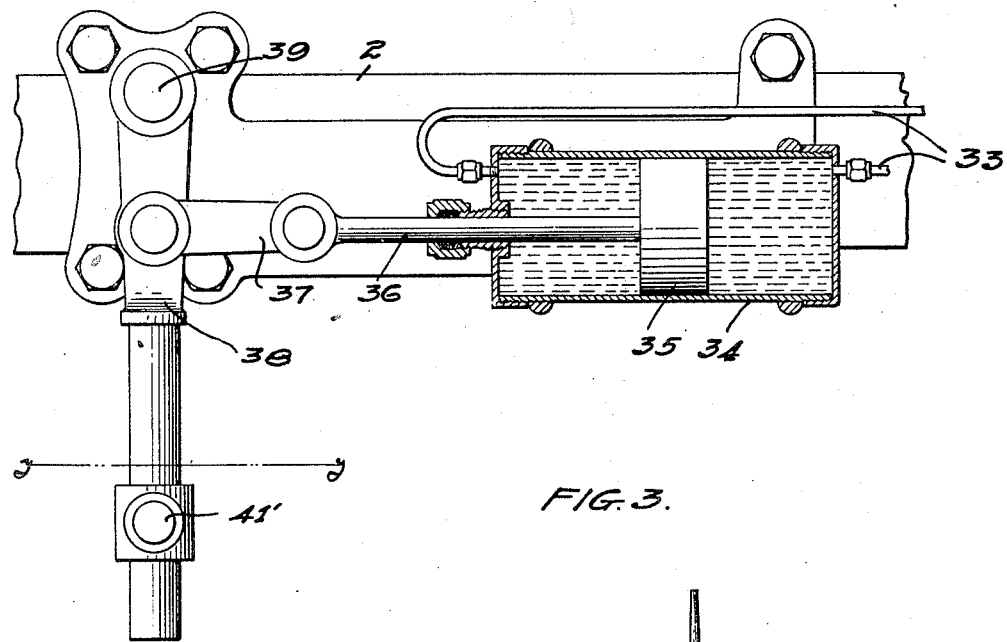

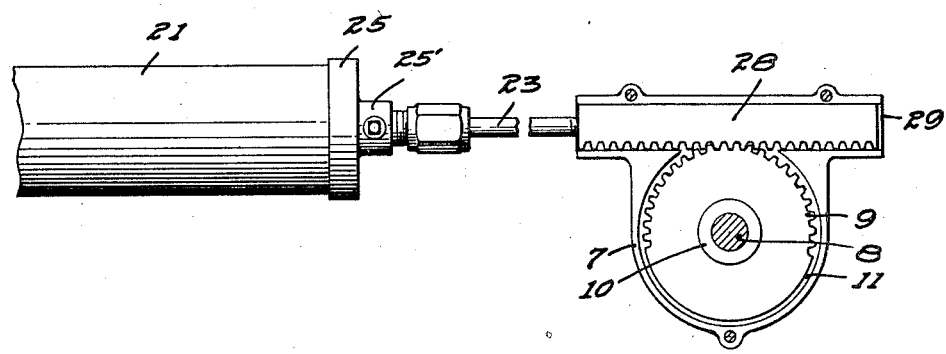
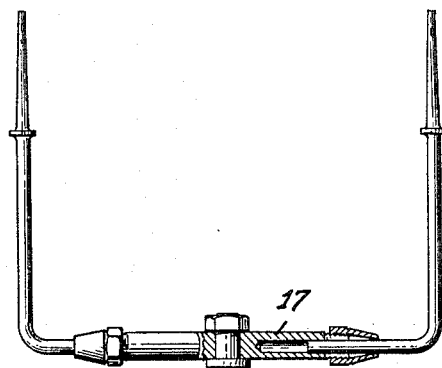
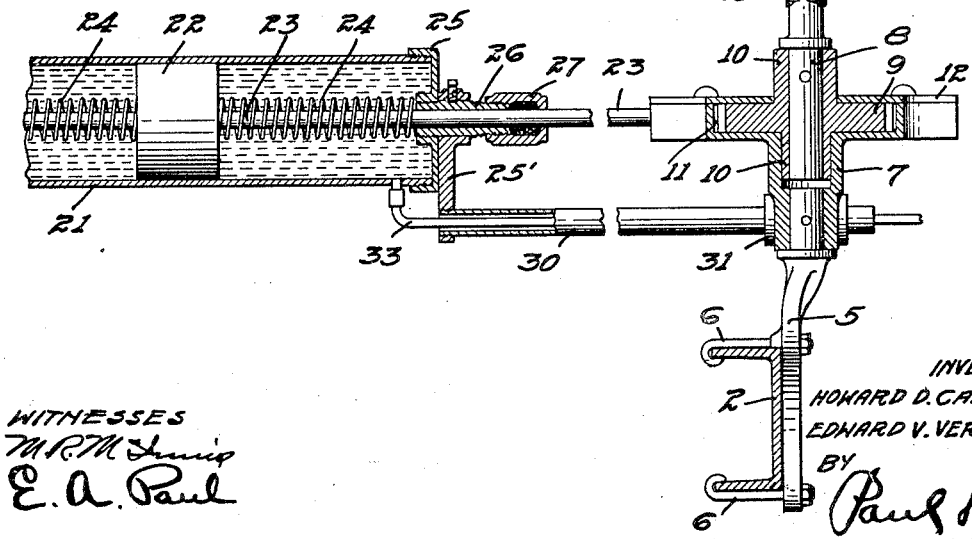

UNITED STATES PATENT OFFICE.

HOWARD D. CAMMACK AND EDWARD V. VERHEYEN, OF MINNEAPOLIS, MINNESOTA, ASSIGNORS, BY MESNE ASSIGNMENTS, TO UNIVERSAL AUTO SUPPLY CO., OF MINNEAPOLIS, MINNESOTA, A CORPORATION OF MINNESOTA.

HEADLIGHT-ADJUSTING MEANS.

1,206,665.  Specification of Letters Patent.  Patented Nov. 28, 1916.

Application filed February 15, 1916. Serial No. 78,375.

*To all whom it may concern:*

Be it known that we, HOWARD D. CAMMACK and EDWARD V. VERHEYEN, citizens of the United States, residents of Minneapolis, county of Hennepin, State of Minnesota, have invented certain new and useful Improvements in Headlight-Adjusting Means, of which the following is a specification.

The object of our invention is to provide a means for adjusting the head-lights of a vehicle, such as an automobile, to the end that the rays of light may be thrown in the direction in which the wheels are turned.

A further object is to provide a support for the lights which will adapt them for country or city use.

A still further object is to provide a compact, inexpensive apparatus which can be easily and quickly applied to any style or make of car and has no parts which can work loose and rattle in the operation of the car.

A still further object is to provide a simple, inexpensive apparatus which can be easily applied to any style or make of car.

The invention consists generally in various constructions and combinations, all as hereinafter described and particularly pointed out in the claims.

Figure 1:
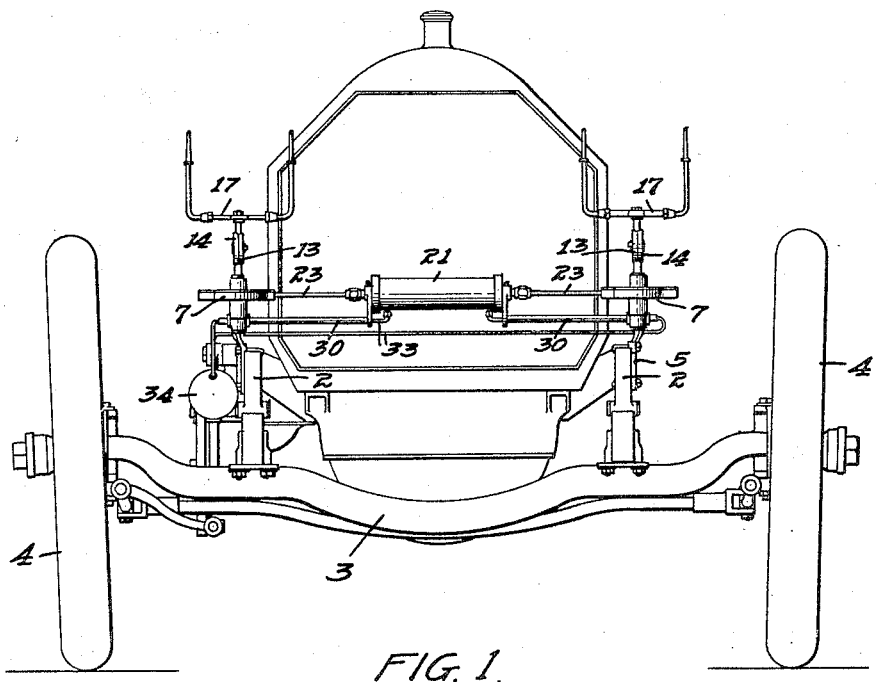
Figure 2:
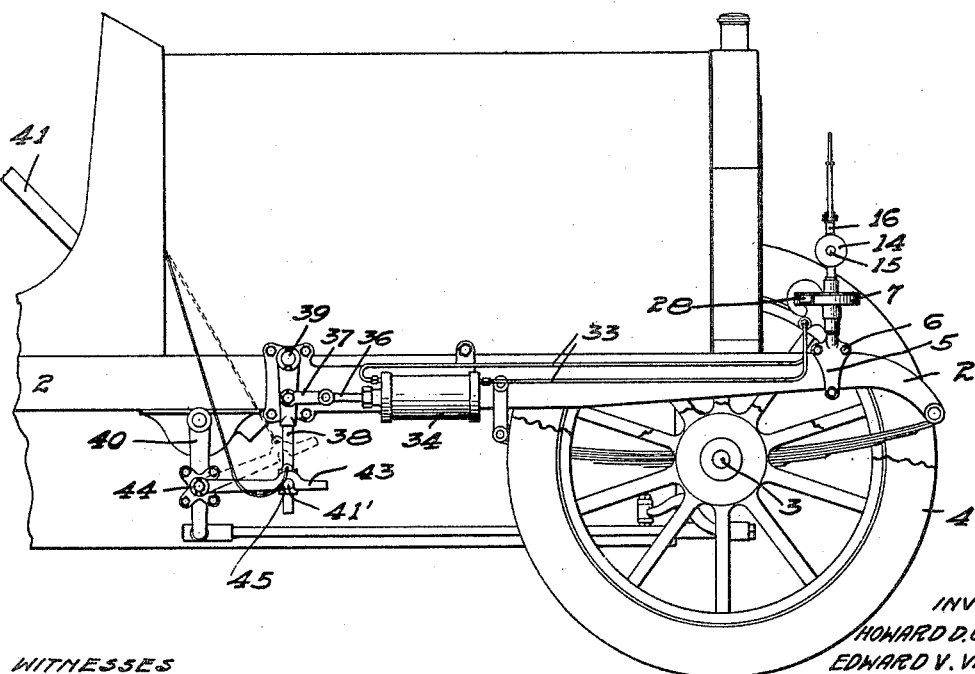

In the accompanying drawings forming part of this specification, Figure 1 is a front elevation of an automobile, with our invention applied thereto, Fig. 2 is a side elevation of the forward portion of the car, Fig. 3 is a detail view, partially in section, of the mechanism that is connected with the steering post of the car, Fig. 4 is a detail view showing the manner of mounting a lamp on the car, Fig. 5 is a sectional view on the line *x*—*x* of Fig. 4, Fig. 6 is a sectional view on the line *y*—*y* of Fig. 3, Fig. 7 is a detail sectional view, showing the connection between the supporting spindle of one of the lamps and the means for rotating the lamp, Fig. 8 is a view, partially in section, showing the connection between the operating cylinder piston rod and the lamp spindle.

In the drawing, 2 represents the side rails or frame of a car of ordinary construction, having a forward axle 3 and carrying wheels 4. The forward end of the side rails 2 projects, as usual, beyond the axle, as indicated in Fig. 2, and brackets 5 are seated against these side rails and secured thereto by suitable means, such as clamps 6. These brackets project upwardly and castings 7 are secured thereon. Spindles 8 have bearings in said castings for rotation therein and gears 9 have hubs 10 secured on the spindle 8, said gears fitting within recesses 11 provided in said castings and accessible upon the removal of covers 12. The spindles 8 are provided with disks 13 at their upper ends, having flat bearing faces against which plates 14 are seated and secured by pivot bolts 15 which allow a limited rotation of the plates against the face of the disk 13. Studs 16 project upwardly from the plate 14 and have bearings for the brackets 17 wherein the head-lights are mounted in any suitable way. The disk 13 has a ball 18 mounted therein to drop into recesses 19 provided in the face of the plate 14 and a spring 20 is arranged to hold said ball in the recesses with a yielding pressure. This ball has the function of an index or finger, allowing the bracket to be swung on the pivot of the plate 14 to a vertical position for throwing the rays of the head-light straight ahead on a country road and also permitting the bracket to be tilted forwardly for the purpose of throwing the rays downwardly upon the roadway when the car is entering a city.

Between the supporting brackets of the head-lights we arrange a horizontal cylinder 21 having a piston 22 mounted on a rod 23. Between the piston and the ends of the cylinder we prefer to provide compression springs 24 which normally tend to hold the piston near the center of the cylinder and the lamps in position for throwing the light straight ahead.

The ends of the cylinder are supported in plates 25 and the piston rod 23 passes through bearings 26 in these plates and through packing boxes 27 and is provided at each end with a rack 28 mounted to slide in guides 29 and mesh with the teeth of the gears 9.

Brackets 25′ depend below the ends of the plates 25 and tubes 30 are secured at one end in said brackets and at their opposite end are fitted into sockets 31 provided in the castings 7 and are adjustable therein by means of clamping screws 32. The adjustment of these tubes lengthwise is thus permitted to adapt the attachment for cars of different width and the piston rod and tubes 30 coöperate to hold the cylinder rigidly in place and the lamps and their supporting brackets in their normal upright position. Evidently as the piston 22 is moved back and forth in the cylinder 21, the gears 9 will be rocked to rotate the brackets and swing the lights back and forth across the roadway.

The cylinder 21 is filled with a suitable inelastic fluid, such as oil, and is connected at each end with tubes 33 which for convenience are carried through the tubes 30 and are connected to the opposite ends of a cylinder 34 secured to one of the side rails of the car in the rear of the forward axle, as indicated in Fig. 2. A sufficient supply of inelastic fluid is maintained in circulation between the two cylinders so that when pressure is applied to the piston 35 in the cylinder 34 it will be transmitted to the piston 22 in the cylinder 21 to move it back and forth in said cylinder and rock the spindles whereon the lights are mounted. The piston 35 has a rod 36 pivotally connected by a link 37 with a lever 38 that is pivoted at 39 on the frame of the machine and depends below said frame to a position adjacent to the arm 40 of the steering mechanism, said arm being rocked through its gear connection (not shown) with the steering post 41 of the car. We have not thought it necessary to illustrate the connection between the steering post and the arm 40 in detail, as it corresponds substantially to the ordinary steering connection of automobiles as usually constructed.

A pin 41' is adjustably mounted on the lever 38 by means of a set screw 42 and an arm 43 is mounted at 44 on the steering arm 40 and is recessed at 45 to receive the pin 41' so that when the steering arm 40 is rocked by the movement of the steering post, the lever 38 will be oscillated to move the piston 35 and through the inelastic fluid in the cylinders and their connections transmit the power to the piston 22 to shift its position in the cylinder and move the piston rod 23 lengthwise and rock the light-supporting spindles. Thus the lights will be absolutely under the control of the driver of the car and will follow the movement of the wheels and throw the rays of light in the direction that the wheels are turned.

The arm 43 is mounted to swing upward by means of the flexible connection 43' to the position indicated by dotted lines in Fig. 2, where it will be out of engagement with the pin 41' and rotation of the steering post will not affect the position of the lights. This would be the day-light position of the arm 43. As soon as the lamps are lighted, this arm can be swung down to the full line position shown in Fig. 2, where it will engage the pin 45 and movement of the steering rack will be transmitted to the fluid pressure operated mechanism to rotate the lamps.

We do not wish to be confined in this application to the mechanism shown for mounting the cylinders and their connections on the car, or the mechanism for operating the lights from the cylinder piston, as in various ways these details of construction may be modified and still be within the scope of our invention.

We claim as our invention:

1. The combination, with the steering mechanism of a power propelled vehicle, of a headlight mounted on the vehicle, an inelastic fluid circulating system, a piston therein connected with said steering mechanism to be actuated through the operation of said mechanism in swinging the wheels, and means connected with said headlight and actuated through said inelastic fluid and the movement of said piston to rotate said head-light simultaneously with the movement of the wheels.

2. The combination, with a power propelled vehicle and its forward wheels and a steering mechanism therefor, of headlights mounted on the vehicle for rotation thereon, a cylinder having a piston operatively connected with said lights for rotating them, a second cylinder and a piston therefor, and inelastic fluid pipes connecting said cylinders with one another and forming therewith an inelastic fluid circulating system, and means connecting the piston of said second cylinder with said steering mechanism.

3. The combination, with a power propelled vehicle and its forward carrying wheels, of a steering mechanism therefor, head-lights mounted on said vehicle, an inelastic fluid circulating system having means connected with said lights for rotating them, a piston in said circulating system, a lever pivotally connected with said piston and means connecting said lever with said steering mechanism for transmitting the movement of the steering post to said lever and piston, for the purpose specified.

4. The combination, with a power propelled vehicle, of headlights mounted to rotate thereon, a fluid pressure circulating system having a piston connected with said headlights, a second piston and means operatively connecting said second piston with said steering mechanism for transmitting the movement of said steering mechanism through said inelastic fluid to said first named piston and lights.

5. The combination, with a power propelled vehicle and headlights mounted for rotation thereon, of a steering mechanism, including a steering post, operating mechanism including an inelastic fluid circulating system for said lights, means connecting said operating mechanism with said steering mechanism for simultaneous operation thereof, said means being mounted for movement to an inactive position to disconnect said steering mechanism from said operating mechanism.

6. The combination, with a power propelled vehicle, and headlights mounted thereon, of a steering rig including a steering post; an inelastic fluid circulating system having a piston operatively connected with said lights, a second piston in said system, an arm connected with said steering rig and having means for connection with said second piston for transmitting the movement of said steering rig thereto, said arm being mounted for movement to an inactive position when the lights are not in use.

7. The combination, with a power propelled vehicle and head-lights mounted for rotation thereon, of a steering mechanism including a steering post, an inelastic fluid circulating system having means connected with said lights for rotating them, a piston in said circulating system, a lever pivotally connected with said piston, a pin projecting from said lever, an arm pivotally connected with said steering mechanism and having means for engaging said pin for transmitting the movement of said steering mechanism to said lever and piston, substantially as described.

In witness whereof, we have hereunto set our hands this 2d day of February, 1916.

HOWARD D. CAMMACK.
EDWARD V. VERHEYEN.